US010924518B2

(12) United States Patent
Dodd-Noble et al.

(10) Patent No.: US 10,924,518 B2
(45) Date of Patent: Feb. 16, 2021

(54) UPF PROGRAMMING OVER ENHANCED N9 INTERFACE

(71) Applicant: Cisco Technology, Inc., San Jose, CA (US)

(72) Inventors: Aeneas Sean Dodd-Noble, Andover, MA (US); Irfan Ali, Palo Alto, CA (US); Pablo Camarillo Garvia, Madrid (ES); Om Prakash Suthar, Bolingbrook, IL (US); Ravi Kiran Guntupalli, Cumming, GA (US); Arun C. Alex, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 176 days.

Patent file contains an affidavit/declaration under 37 CFR 1.130(b).

(21) Appl. No.: 16/118,554

(22) Filed: Aug. 31, 2018

(65) Prior Publication Data

US 2020/0007590 A1 Jan. 2, 2020

Related U.S. Application Data

(60) Provisional application No. 62/692,518, filed on Jun. 29, 2018.

(51) Int. Cl.
*G06F 15/16* (2006.01)
*H04L 29/06* (2006.01)
(Continued)

(52) U.S. Cl.
CPC ........ *H04L 65/104* (2013.01); *H04L 12/4633* (2013.01); *H04L 65/1069* (2013.01); *H04L 67/14* (2013.01)

(58) Field of Classification Search
CPC .................................................. H04W 76/12
(Continued)

(56) References Cited

U.S. PATENT DOCUMENTS 9,497,661 B2 11/2016 Kempf et al.
9,667,481 B2 5/2017 Chandramoull et al.
(Continued)

FOREIGN PATENT DOCUMENTS

WO 2018008980 A1 1/2018

OTHER PUBLICATIONS

Cisco Systems et al: "Chained Upf", 3GPP Draft; S2-185454-Chained UPF-SA 127BIS V2, 3RD Generation Partnership Project (3GPP), Mobile Competence Centre ; 650, Route Des Lucioles ; F-06921 Sophia-Antipolis Cedex ; France, vol. SA WG2, no. Newport Beach, USA; 20180528-20180601 May 28, 2018 (May 28, 2018), XP051535948.*

(Continued)

*Primary Examiner* — Hamza N Algibhah

(57) ABSTRACT

Various implementations disclosed herein enable programming user plane gateway controllers over enhanced N9 interfaces. In various implementations, a method of gateway controlling is performed by a computing device including one or more processors, and a non-transitory memory. In various implementations the method includes determining, by a first packet gateway controller connected to a first session manager device, that a user equipment moved to a geographical area that is served by a second session manager device. In some implementations, the method includes receiving, by the first packet gateway device, a set of information for a second packet gateway device. In some implementations, the method includes transmitting, by the first packet gateway device, a session establishment request via a first network interface to the second packet gateway (Continued)

controller using segment routing via a second network interface.

20 Claims, 9 Drawing Sheets

(51) Int. Cl.
*H04L 12/46* (2006.01)
*H04L 29/08* (2006.01)

(58) Field of Classification Search
USPC .......................................................... 709/223
See application file for complete search history.

(56) References Cited

U.S. PATENT DOCUMENTS

| | | | |
|---|---|---|---|
| 2018/0097657 A1* | 4/2018 | Dao .................... | H04L 12/4633 |
| 2018/0192390 A1 | 7/2018 | Li et al. | |
| 2018/0199243 A1* | 7/2018 | Bharatia ........... | H04W 36/0027 |
| 2018/0199398 A1* | 7/2018 | Dao .................. | H04W 36/0022 |
| 2018/0262424 A1* | 9/2018 | Roeland .............. | H04L 12/4633 |
| 2018/0376384 A1* | 12/2018 | Youn ................. | H04W 36/0022 |
| 2019/0029065 A1* | 1/2019 | Park ........................ | H04W 8/08 |
| 2020/0100080 A1* | 3/2020 | Mladin ................... | H04W 4/50 |
| 2020/0112522 A1* | 4/2020 | Dannebro ............. | H04L 47/805 |
| 2020/0112898 A1* | 4/2020 | Ramle ................... | H04W 36/08 |
| 2020/0120570 A1* | 4/2020 | Youn .................... | H04W 48/16 |
| 2020/0128430 A1* | 4/2020 | Yi ...................... | H04W 28/0263 |
| 2020/0128431 A1* | 4/2020 | Jo ...................... | H04W 28/0263 |
| 2020/0128452 A1* | 4/2020 | Centonza .......... | H04W 28/0263 |
| 2020/0128469 A1* | 4/2020 | Akhavain Mohammadi ............... H04L 69/22 | |
| 2020/0128507 A1* | 4/2020 | Ryu ....................... | H04W 4/021 |
| 2020/0145787 A1* | 5/2020 | Roy Choudhury ......................... H04W 64/003 | |
| 2020/0252838 A1* | 8/2020 | Akdeniz ................ | H04W 4/70 |

OTHER PUBLICATIONS

Rayishankar Ravindran et al., "Realizing ICN in 3GPP's 5g NextGen Core Architecture", IEEE, Nov. 7, 2017, pp. 1-7.
International Search Report and Written Opinion in counterpart International Application No. PCT/US2019/038458, dated Sep. 30, 2019, 18 pages.
Cisco Systems et al., "Chained UPF", SA WG2 Meeting #127bis, S2-185454, May 28-Jun. 1, 2018, 5 pages.
S. Matsushima et al., "Segment Routing IPv6 for Mobile User-Plane", draft-matsushima-spring-dmm-srv6-mobile-uplane-03, Spring and DMM, Internet-Draft, Intended status: Standards Track, Nov. 12, 2017, 20 pages.
Huawei et al., "Clarification on UPF tunnel change", 3GPP TSG-SA WG2 Meeting #128, S2-186782, Jul. 2-6, 2018, 28 pages.
3GPP, "3rd Generation Partnership Project; Technical Specification Group Services and System Aspects; Procedures for the 5G System; Stage 2 (Release 15)", 3GPP TS 23.502 V1.3.0, Nov. 2017, 217 pages.
3GPP Organizational Partners, "3rd Generation Partnership Project; Technical Specification Group Services and System Aspects; Study on Enhancing Topology of SMF and UPF in 5G Networks (Release 16)", 3GPP TR 23.726 V0.5.0, Jul. 2018, 85 pages.
Cisco Systems, "SA WG2 Temporary Document", SA WG2 Meeting #S2-127, S2-183591, Apr. 23-27, 2018, 6 pages.
Satoru Matsushima, "Reducing the complexity of 5G networks using Segment Routing IPv6", Category: Tech matters, Mar. 7, 2018, 10 pages.
3GPP Organizational Partners, "3rd Generation Partnership Project; Technical Specification Group Services and System Aspects; System Architecture for the 5G System; Stage 2 (Release 15)", 3GPP TS 23.501 V15.1.0, Mar. 2018, 201 pages.
3GPP Organizational Partners, "3rd Generation Partnership Project; Technical Specification Group Services and System Aspects; Procedures for the 5G System; Stage 2 (Release 15)", 3GPP TS 23.502 V15.1.0, Mar. 2018, 285 pages.
C. Filsfils et al., "SRv6 Network Programming", draft-filsfils-spring-srv6-network-programming-04, Spring, Internet-Draft, Intended status: Standards Track, Mar. 4, 2018, 57 pages.
S. Previdi et al., "IPv6 Segment Routing Header (SRH)", draft-ietf-6man-segment-routing-header-12, Network Working Group, Internet-Draft, Apr. 19, 2018, 28 pages.
David Gomez-Barquero et al., "Point-To-Multipoint Communication Enablers for the Fifth Generation of Wireless Systems", IEEE Communications Standards Magazine, Mar. 2018, 7 pages.
Ramon Ferrús et al., "On 5G Radio Access Network Slicing: Radio Interface Protocol Features and Configuration", IEEE Communications Magazine, May 2018, 9 pages.
Marcos Rates Crippa et al., "Baseline architecture based on 5G-PPP Phase 1 results and gap analysis", 5G Mobile Network Architecture, Deliverable D2.1, H2020-ICT-2016-2, 5G-MoNArch, Project No. 761445, Nov. 6, 2017, 84 pages.

* cited by examiner

UPF PROGRAMMING OVER ENHANCED N9 INTERFACE

TECHNICAL FIELD

The present disclosure generally relates to the $3^{rd}$ Generation Partnership Project (3GPP) $5^{th}$ Generation (5G) communications, and in particular, to connecting between various User Plane Functions (UPF) in a network.

BACKGROUND

In 5G telecommunications networks, multiple UPF's are typically connected to a single Session Management Function (SMF) in a region or area. At the Anchor SMF (A-SMF), session management takes place. Charging is invoked, for example, at the A-SMF. Policy may be applied at the A-SMF and conveyed to the User Equipment (UE). Internet Protocol (IP) addresses and applicable Virtual Routing and Forwarding (VRF) are assigned to the UE and associated with the Anchor UPF (A-UPF) that is connected to the A-SMF. The A-UPF is often referred to as the Protocol Data Unit (PDU) Session Anchor (PSA). An efficient system and method to control the UE is needed when UE's move further and further away from a geographic location (controlled by the A-SMF). In some cases, another SMF retrieves the UE context from the A-SMF with complex signaling using Service Based Architecture (SBA). Communication between UPF's that are connected to different SMF's can, therefore be time consuming, loose and IP preservation.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
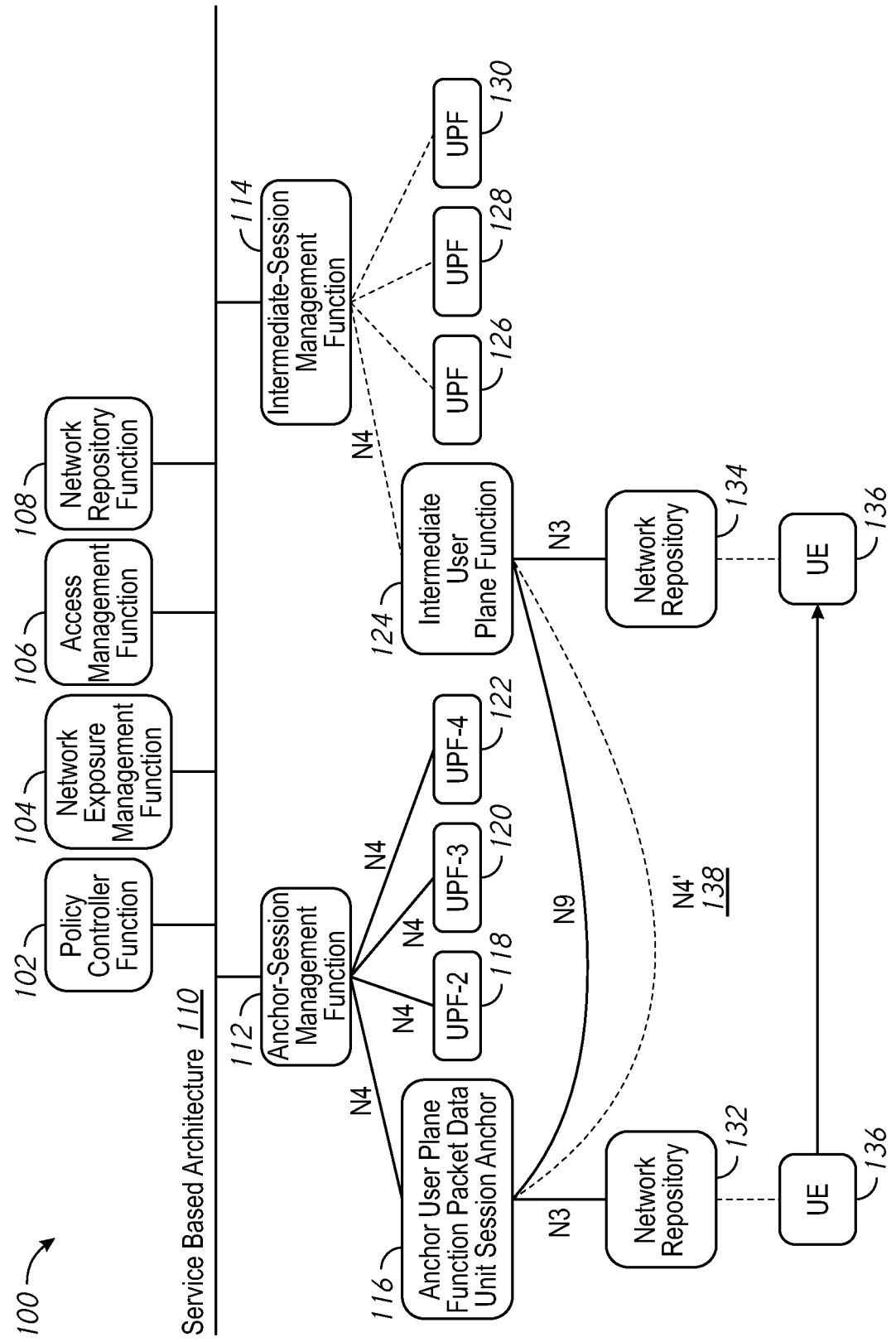
FIG. 1 is a schematic diagram of a telecommunications network environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example implementations described herein. While pertinent features are shown and described, those of ordinary skill in the art will appreciate from the present disclosure that various other features, including well-known systems, methods, components, devices, and circuits, have not been illustrated or described in exhaustive detail for the sake of brevity and so as not to obscure more pertinent aspects of the example implementations disclosed herein.

Overview

Various implementations disclosed herein enable programming user plane gateway controllers over enhanced N9 interfaces. In various implementations, a method of gateway controlling is performed by a computing device including one or more processors, and a non-transitory memory. In various implementations the method includes determining, by a first packet gateway controller connected to a first session manager device, that a user equipment moved to a geographical area that is served by a second session manager device. In some implementations, the method includes receiving, by the first packet gateway device, a set of information for a second packet gateway device. In some implementations, the method includes transmitting, by the first packet gateway device, a session establishment request via a first network interface to the second packet gateway controller using segment routing via a second network interface. In some implementations, the method includes receiving, by the first packet gateway device, a session establishment response of the first network interface type from the second packet gateway device, via the second network interface, confirming the second packet gateway device's ability to meet a requested quality of service and maximum bit rate, and providing the second packet gateway device's address, and a set of tunnel identifiers. In some implementations, the method includes transmitting, by the first packet gateway device, the session establishment response of the first network interface type, to the first session manager device.

Example Embodiments

To optimize signaling some implementations include a lightweight N4 signaling (N4' or N4 'Prime') between an A-UPF and I-UPF, where when a UE relocates to a new UPF, the anchor UPF (A-UPF) can use the N4' control interface as defined in various implementations discussed herein. FIG. 1 is a schematic diagram of a telecommunications network environment 100 in accordance with some implementations. Telecommunications network environment 100 may contain service-based architecture 110. Service based architecture 110 may contain devices and services including policy controller function 102, network exposure management function 104, access management function (AMF) 106, and network repository function 108. In some implementations policy controller function 102, network exposure management function 104, policy controller function 102, network exposure management function 104, AMF 106, and network repository function 108 are each a device including one or more processors which are capable of executing computer readable instructions included on a non-transitory memory. In other implementations policy controller function 102, network exposure management function 104, policy controller function 102, network exposure management function 104, AMF 106, and network repository function 108 each are a service or function running on one or more virtual machines. In some implementations, service-based architecture 110 is connected over a large geographic region, covering multiple session managers. Service-based architecture 110 may be 5G network, for example.

UE 136 may be a mobile or stationary device such as a radio, phone, computer, tablet, or digital watch. In some implementations, UE 136 is connected to an A-UPF such as anchor user plane function packet data unit session anchor (A-UPF PSA) 116. UE 136 may be assigned NR 132 while attached to A-UPF PSA 116 and communicate over a N3 protocol. A-UPF PSA 116 may be connected to A-SMF 112 communicating via a N4 protocol. In one geographic area, UE 136 may communicate with UPF-2 118, UPF-3 120, and UPF-4 122 all through A-SMF 112.

In some implementations, UE 136 may attach to intermediate user plane function (I-UPF) 124 when moving from one geographic area to another. When attaching to I-UPF 124, UE 136 may be assigned or receive NR 134 which may be different from NR 132. I-UPF 124 may be connected to intermediate anchor session management function (I-SMF) 114 and communicate via a N4 protocol. I-SMF 114 may also be connected to the UPF 126, UPF 128, and the UPF 130 all within the same geographic region.

In some implementations the A-SMF 112 or I-SMF 114 may terminate signaling for PDU establishment, policy and charging. Similarly, in other implementations, the AMF 106 may process mobility events associated with UE 136. In other implementations, the A-UPF PSA 116 may advertise the IP address assigned to UE 136 to the IP network. The NR 132-134 indicates its tracking area ID (TAI) which is used to identify where in a network a UE is. The network repository function 108 may register network devices, capabilities or functions in a network and help other network devices discover each other.

In some implementations N9 is used as a 3GPP mobility communication protocol for communication between the A-UPF PSA 116 and I-UPF 124. In other implementations segment routing communications may be used on N9 instead of the GPRS Tunneling Protocol (GTP). Various versions of segment routing such as Segment Routing over IPv6 (SRv6) may be used. In some implementations the N4 protocol may be used to configure a UPF from a SMF. In some implementations, A-UPF PSA 116 may communicate with I-UPF 124 using N4' 138. N4' may include a subset of part of N4 using segment routing such as SRv6.

Further in some implementations, there may be an IP connection between the A-UPF PSA 116 and I-UPF 124 using a dynamic routing protocol in order to ensure reachability. In some implementations SRv6 may be used to send the Fully Qualified Tunnel End Point Identifier (F-TEID) for the N3 interface in a Segment ID (SID), along with other supporting information.

Figure 2:
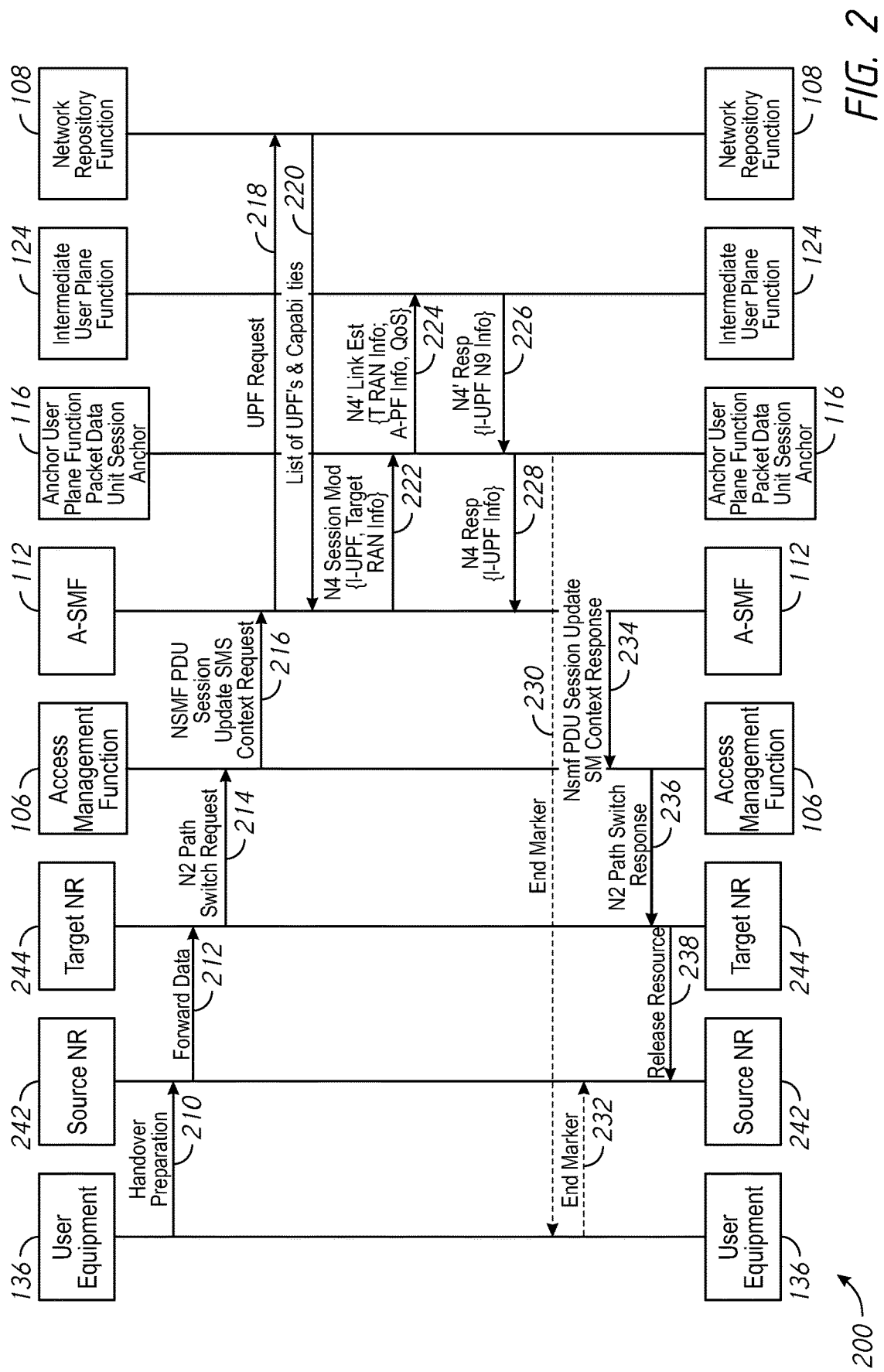
FIG. 2 is a sequence diagram illustrating a flow of requests and responses in accordance with some implementations.

FIG. 2 is a sequence diagram illustrating a flow of requests and responses 200 in accordance with some implementations. The flow of requests and responses 200 may include an initial session establishment. In one implementation, the flow of requests and responses 200 may include a handover procedure where a target network repository is unreachable from the UPF's managed by the A-SMF 112.

In one implementation in step 210 the UE 136 may communicate with the source NR 242 to prepare for a handover. In step 212, the source NR/NG-RAN may then forward the appropriate data to target NR 244. In step 214, the target NR 244 may provide a N2 path switch request to the AMF 106. Steps 210-214 may be performed according to the 3GPP technical specification, for example. For example, in one implementation, steps 210-214 are performed according to the 3GPP technical specification 23.502.

In step 216, the AMF 106 may transmit a network slice manager PDU session update context request to A-SMF 112. The request in step 216 may include the TAI of the target NR 244, which may then be resolved to a set of UPF's. In some implementations, the A-SMF 112 may perform UPF selection based on the 3GPP technical specification 23.501. In some implementations, there may be an operator configuration, or the A-SMF 112 may discover an applicable UPF from a network repository function discovery if there are not suitable UPF's known to A-SMF 112.

In step 218, the A-SMF 112, may query the network repository function 108 for appropriate network repository capabilities. In one example, the TAI is for a UPF that is associated with A-SMF 112. In step 220, the network repository function 108 may return the I-UPF 124 for the requesting UPF, along with its capabilities. As the session manager does not have visibility into the UPF's load and capabilities, it may be reliant on the network repository function 108 to provide this information. Some implementations may depend on the UPF supporting the N4' interface. In cases that the UPF does not support this capability, the A-SMF 112 may use an I-SMF 114.

In step 222, the A-SMF 112 may choose to use the I-UPF 124 with session and service continuity mode 1 based on the policy and information returned or configured locally. The A-SMF 112 may provide the I-UPF 124 information to the A-UPF PSA 116. Among the I-UPF 124 information, the SRv6 End.M.N4 SID address is conveyed at the I-UPF. (SRv6 End.M.N4 described below). The A-SMF 112 may have knowledge of the I-UPF 124 SRv6 SID address by: a static configuration, an address signaled by the network repository function 108 in the prior step, and/or a query to the policy and charging engine.

In step 224, the A-UPF PSA 116 may transmit to the I-UPF 124 a N4 Session Establishment Request, including Target Next Generation Radio Access Network (NG-RAN) address, Uplink (UL) and Downlink (DL) tunnel identifiers. In some implementations, information on the N4 could be passed using the routing protocol because there is an IP connection between the A-UPF PSA 116 and I-UPF 124 for N9. In some implementations, the UPF uses a dynamic routing protocol or software defined networking capabilities.

Upon reception at the I-UPF 124 in step 224, the processing by the I-UPF 124 may include the following steps in some implementations:

1. The UPF receives a packet with a SID with the function End.M.N4. This triggers the UPF control to process the packet.

2. UPF then:
   a. Confirms that it can meet the chaining requirements (whether the quality of service (QoS) requested, and maximum bit rate (MBR) can be supported)
   b. Looks up the N3 IP address, and ensures it is reachable or not barred.
   c. Allocates a TEID for its N3 interface.
   d. Replies to the packet source (defined in step 226)

In step 226, The I-UPF 124 may respond to the A-UPF PSA 116 with a N4 Session Establishment Response. The response may include, for example, the Target UPF address, and the tunnel identifiers for the DL user plane.

Upon reception at the A-UPF PSA 116, in step 226, the processing may include:
   1. The UPF receiving the packet with a SID with the function End.M.N4, and triggering the UPF control to process the packet.
   2. UPF then provides a positive result and reply to A-SMF 112 when the Type Length Value (TLV) contains a F-TEID. Or the UPF processes a failure code and re-selects another UPF otherwise.

In step 228, the A-UPF PSA 116 may respond to the A-SMF 112 by providing a N4 Session Establishment Response. The response may include, for example, the Target UPF address, and Tunnel Identifiers for the DL User Plane. In step 230, to assist the reordering function in the Target NG-RAN, the A-UPF PSA 116 sends one or more "end marker" packets for each N3 tunnel on the old path, immediately after switching the path, the source NG-RAN then forwards the "end marker" packets to the target NG-RAN.

In some implementations, in step 234 the A-SMF 112 transmits to the AMF a PDU session update context request including tunnel info. The tunnel info may include UL tunnel identifiers and the address of the new intermediate UPF.

In step 232 UE 136 may transmit an end marker to the source NR 242. In step 234 the A-SMF 112 may transmit the network slice manager PDU session update context request back to the AMF 106. In step 236, the AMF 106 may provide the N2 path switch response to the target NR 244. Then finally, in step 238 the target NR 244 may indicate to the source NR to release the resource.

In some implementations a SRv6 function may be used. In one example, the function may be called Endpoint function with N4 processing (End.M.N4). In one implementation, the Endpoint function is a SRv6 SID that is received by A-UPF PSA 116/I-UPF 124 on the N9 interface and upon reception triggers N4 processing. In some implementations, the function may be defined as (in chained UPF's at the N9 interface in between UPF's):

When a UPF node N receives a packet destined S and S is a local End.M.N4 SID, N performs:
   1. If ENH=59 & SL=0, then
   2. Transfer the packet TLV to UPF control-plane processing
   3. Else
   4. Drop the packet Similarly, in some implementations, a TLV may be defined that is carried in an SRv6 segment routing header, for example. The TLV may carry the information required for N4 session establishment requests/responses. The TLV may include a F-TEID, QoS and MBR requirements, a session identification, uplink (UL) and downlink (DL) tunnel endpoint identifiers, a failure code, and a message type (N4 session establishment request/N4 session establishment response). In another implementation, the N4 Session Establishment Request and the N4 Session Establishment Response messages may be encoded as independent SRv6 user-plane functions. In this implementation, the function parameters are encoded as an SRv6 segment routing header TLV.

Figure 3:
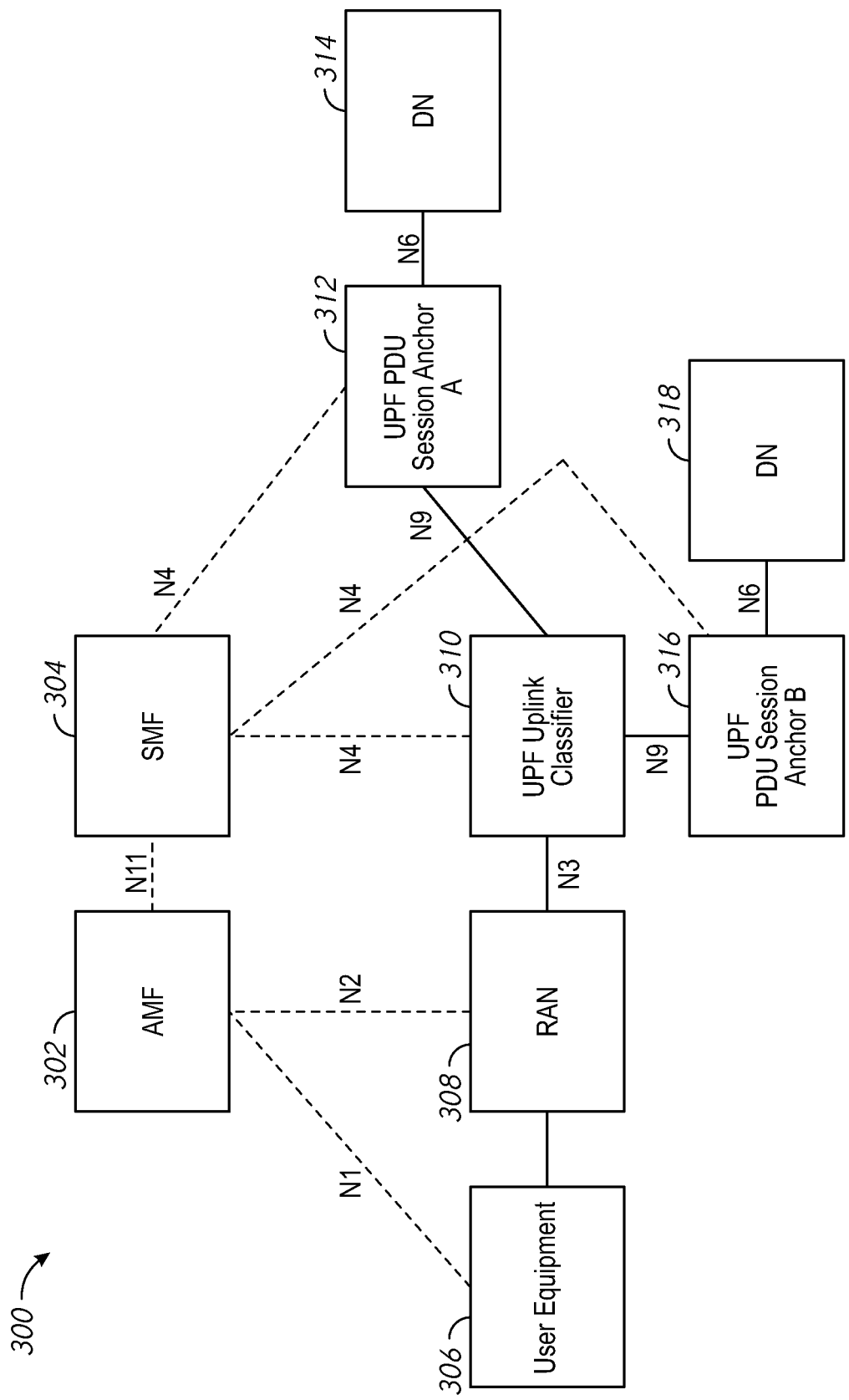
FIG. 3 is an exemplary user plane architecture for an uplink classifier in accordance with some implementations.

FIG. 3 illustrates an exemplary user plane architecture 300 for an uplink classifier in accordance with some implementations. User plane architecture 300 may include AMF 302, SMF 304, UE 306, radio access network (RAN) 308, UPF uplink classifier 310, UPF PDU session anchor A 312, downlink (DN) 314, UPF PDU session anchor B 316 and DN 318. User plane architecture 300 includes the ability to drop off traffic locally towards a different data network in some implementations. In other implementations the user plane architecture 300 includes the ability to pass traffic to a second user plane function such as A-UPF PSA 116 using the N9 interface.

Figure 4:
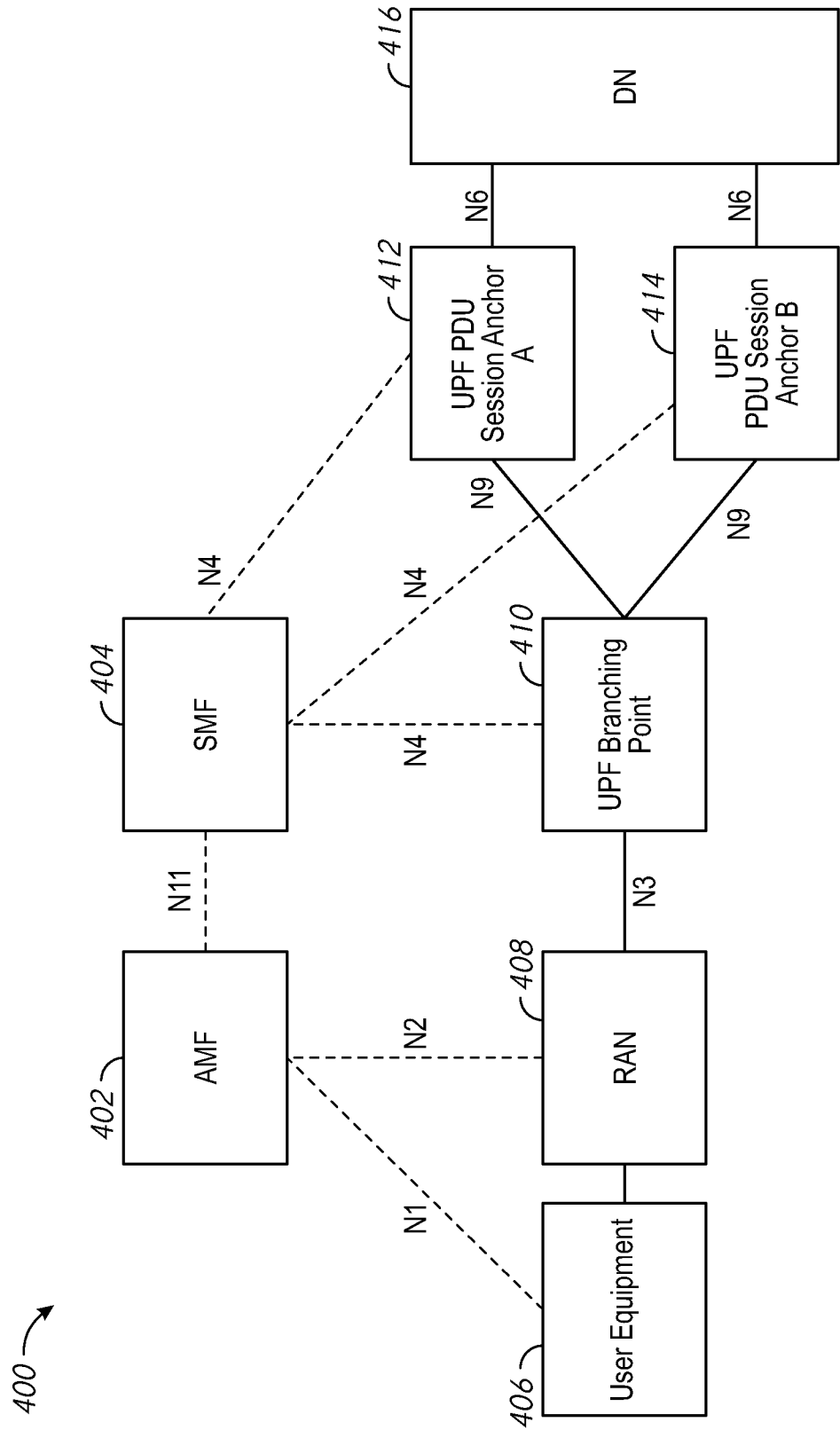
FIG. 4 is an exemplary multi-homed PDU session in a service continuity case in accordance with some implementations.

FIG. 4 is an exemplary multi-homed PDU session 400 in a service continuity case in accordance with some implementations. Multi-homed PDU session 400 may include AMF 402, SMF 404, UE 406, RAN 408, UPF Branching Point 410, UPF PDU Session Anchor A 412, UPF PDU Session Anchor B 414 and DN 416.

In some implementations when operators utilize intermediate UPF's, the session manager such as SMF 404 may be expected to manage rules across various UPF's to guarantee accurate accounting. The UPF may be provisioned with a set of rules to match, and corresponding actions to perform. Exemplary rules may include:
   Rule #1: Packets matching destination host "yahoo.com."
   Rule #2: Packets with protocol type set as UDP.
   Rule #3: Packets destined towards "cisco.com."
   Similarly, exemplary actions may include:
   Action #1: Rate Limit the packets.
   Action #2: Direct the packets towards local Data Network.
   Action #3: Zero rate the packets.
   Action #4: Account against Rating Group #500.

Once accounting is performed, the Rating Group #500 may indicate a certain cost associated towards the packets for this rating group in various systems towards end user billing. The same rule or rules may be installed in an initial UPF at the uplink classifier or branching point, and at the A-UPF. Different actions though may be taken at each UPF. In one example, the UPF uplink classifier 310 may take Action #1 for Rule #1, and rate limit packets going toward "Yahoo.com" whereas the A-UPF may take Action #3 for Rule #1 and zero rate the packets. In some implementations, when the user plane is transmitted across the N9 interface (the interface between UPF uplink classifier 310 and UPF PDU session anchor A 312), both of the UPF's have to first remove either the GTP or another encapsulation header, and rule match the packets before applying a corresponding action.

Figure 5:
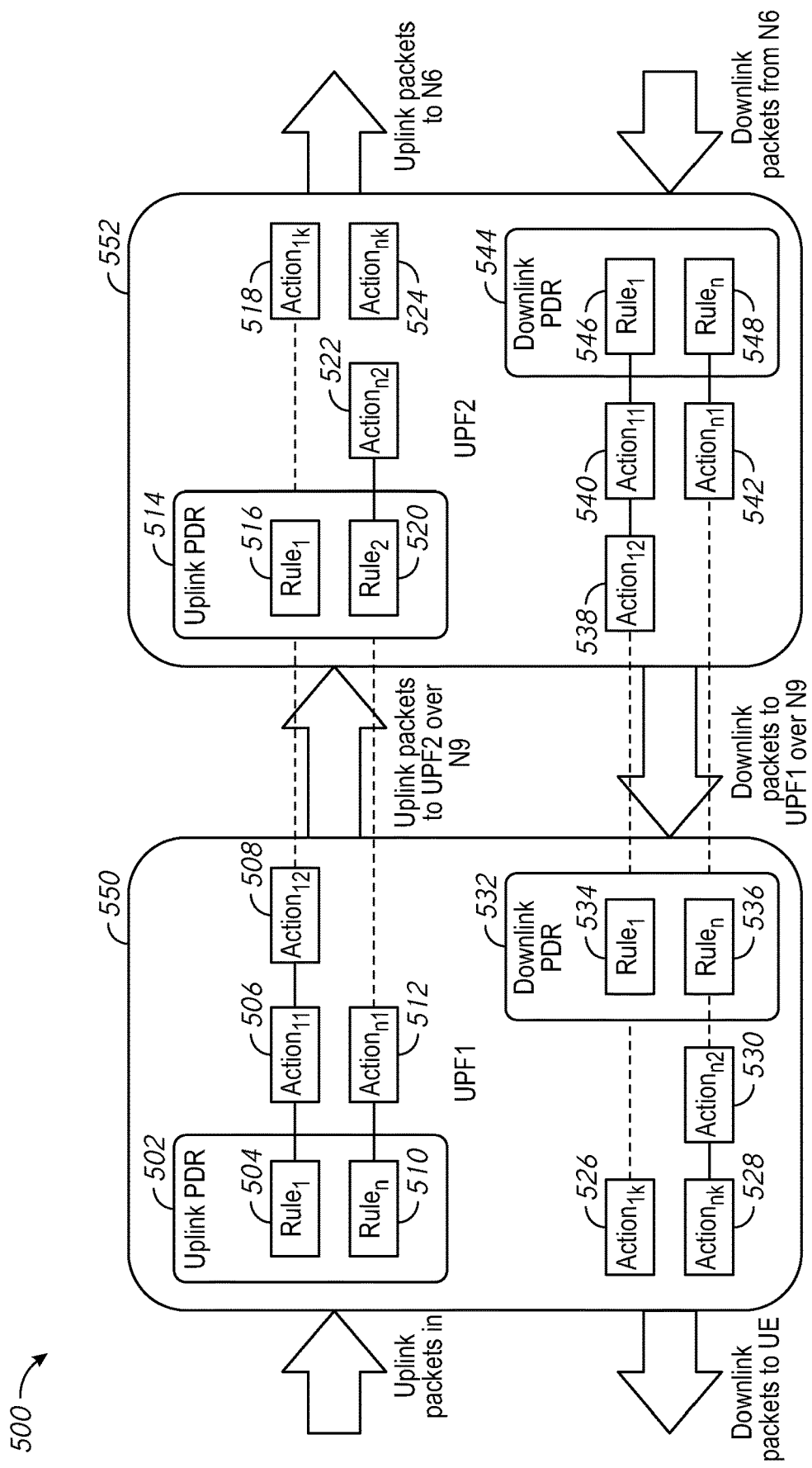
FIG. 5 is an exemplary rule matching system in accordance with some implementations.

FIG. 5 is an exemplary rule matching system 500 in accordance with some implementations. Exemplary rule matching system 500 may include UPF1 550 and UPF2 552 which may communicate uplink and downlink packets over N9. UPF1 550 may include uplink packet data radio (PDR) 502 and downlink PDR 532. Uplink PDR 502 may include one or more rules such as $rule_1$ 504 up to $rule_n$ 510. Uplink PDR 502 may read $rule_1$ 504 and perform $action_{11}$ 506 and $action_{12}$ 508. Similarly, UPF1 550 may read $rule_n$ 510 and perform $action_{n1}$ 512. In some implementations uplink PDR 502 may pass $rule_1$ 516-rule. 520 to uplink PDR 514. Further, in some implementations uplink PDR 514 may traverse rule$_1$ 516-rule$_n$ 520 and perform actions action$_{1k}$ 518, and action$_{n2}$ 522-action$_{nk}$ 524 respectively.

Similarly, on the downlink path, downlink PDR 544 may read rule$_1$ 546-rule$_n$ 548 and take actions action$_{11}$ 540-action$_{12}$ and action$_{n1}$ 542 respectively as indicated. In some implementations the downlink PDR 544 may pass rule$_1$ 534-rule$_n$ 536 to downlink PDR 532. Additionally, in some implementations downlink PDR 532 may read ruler 534 and perform action$_{1k}$ 526. Similarly, downlink PDR 532 may read rule$_n$ 536 and take actions action$_{n2}$ 530-action$_{nk}$ 528.

The same packet may have to be first matched with a certain rule before applying the actions which could result in wastage of CPU cycles and also potentially add additional latency into the user plane packets. In one exemplary implementation, Rule$_1$ in UPF1 550, for example may be read: "match to yahoo.com for video segment 4055." Similarly actions taken, may be "offload the traffic." Then in UPF2 552, there may be a rule, for example, "match to yahoo.com for video" and an action action$_2$: "police traffic to 2 Mbps." In this example, very detailed filtering occurs in both UPF1 550 and UPF2 552. It may be more efficient to move rule-2 packet matching also to UPF1 550 and only perform the action in UPF2 552. Some implementations, create an additional header on the UPF1 550 and UPF2 552 to indicate that the packet has matched rule-2 and UPF2 552 only needs to perform action$_2$, based on the marker header on the N9 interface. Similar implementations may occur for downlink packets as well.

Figure 6:
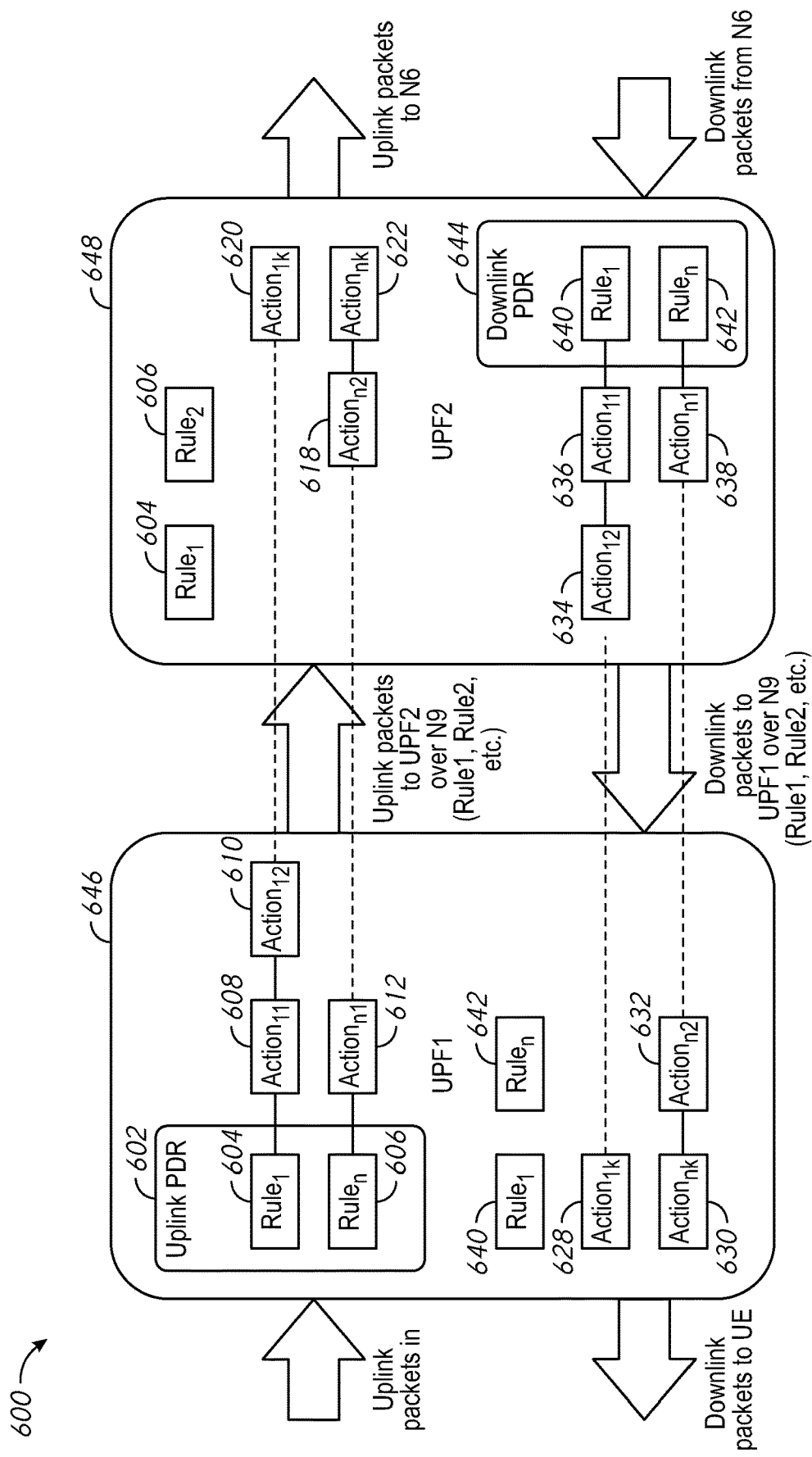
FIG. 6 is an exemplary rule matching system in accordance with some implementations.

FIG. 6 is an exemplary rule matching system 600 in accordance with some implementations. Exemplary rule matching system 600 may include UPF1 646 and UPF2 648. UPF1 646 may include uplink PDR 602 which reads rule$_1$ 604-rule$_n$ 606. The N9 interface may be modified so that the GTP-U header includes the Rule ID to which the packet was matched by an initial UPF and an indication from the control plane that this rule should be included in the GTP-U header. In exemplary rule matching system 600, actions 608, and action$_{12}$ 610 are taken on UPF1, while different actions such as action$_{1k}$ 620, action$_{n2}$ 618 and action$_{nk}$ 622 are taken on UPF2 648. No rule reading takes place on UPF2 648 as it is already done in UPF1 646.

In the downlink path, the rules are similarly read first on UPF2 648 on downlink PDR 644. Rule$_1$ 640 up to rule$_n$ 642 are read in downlink PDR 644 and actions 636, action$_{12}$ 634 and action$_{n1}$ 638 are taken on UPF2 648. No rules are read in the downlink path on UPF1 646, however actions action1k 628, action$_{nk}$ 630-action$_{n2}$ 632 are taken.

In some implementations, the logic on UPF1 646 may include steps for uplink packets such as:

1. Match the rules for the packets.
2. Take the appropriate action.
3. Include the matched rule identifiers (and indicated by the control plane to be included over the GTP-U header).

Similarly, in some implementations, the logic on the UPF2 648 may include the steps:

1. Skip rule matching since the N9 header includes the matched rules.
2. Take the appropriate actions installed based on the rules indicated for the packet.

Figure 7:
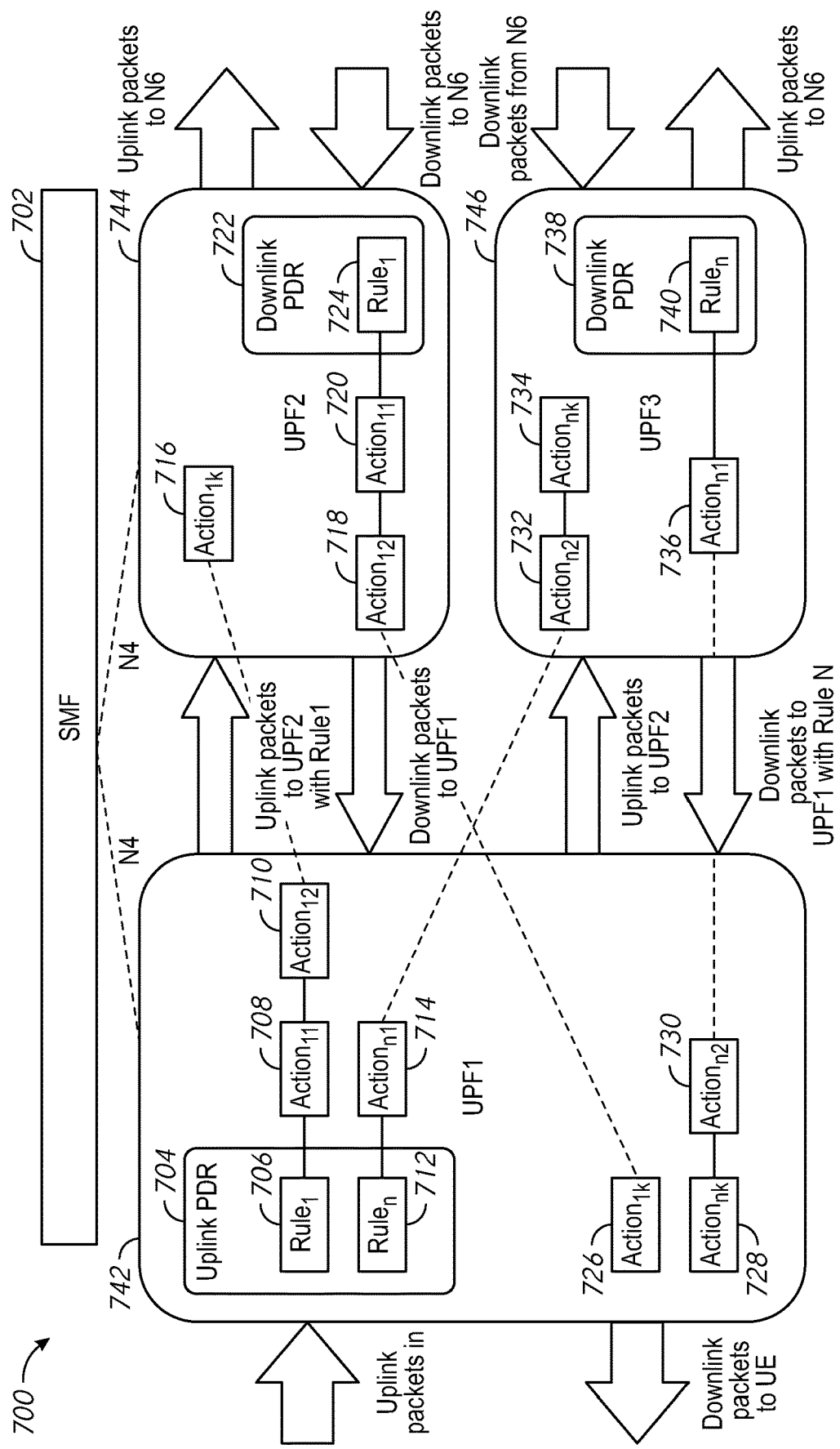
FIG. 7 is an exemplary branching point user plane function in accordance with some implementations.

FIG. 7 is an exemplary branching point user plane function system 700 in accordance with some implementations. Exemplary branching point user plane function system 700 may include SMF 702, UPF1 742, UPF2 744, and UPCG3 746. UPF1 742 may include uplink PDR 704 which traverses rules rule$_1$ 706-rule$_n$ 712 and takes actions action$_{11}$ 708, action$_{12}$ 710 and action$_{n1}$ 714. Action$_{1k}$ 716 may be provided to UPF2 744 and actions action$_{n2}$ 732-action$_{nk}$ 734 to UPF3 746. On the downlink path, downlink PDR 722 may read rule$_1$ 724 and take actions action$_{11}$ 720 and action$_{12}$ 718. Similarly, action$_{1k}$ 726 may be provided by downlink PDR 722 to UPF1 742. In some implementations, downlink PDR 738 may read rule$_n$ 740 and take action$_{n1}$ 736 and then provide actions action$_{n2}$730-action$_{nk}$ 728.

In some implementations, logic in the SMF 702 and/or the Control Plane may include provisioning the rules and actions across the multiple UPF's to determine which rules are duplicated across multiple UPF's and indicate to the first UPF (UPF Uplink Classifier or branching point UPF in the case of Uplink Traffic and A-UPF in the case of Downlink traffic) the Rule ID is common across the UPF's. Not all matched rules are included but only the Rule IDs that are also installed in the subsequent UPF are included on the N9 interface header.

An exemplary implementation of logic on the SMF 702 or control plane may include the following steps:

1. Identify which Rule IDs should be installed on which UPF's.
2. Identify the "first" UPF that will match rules, for example, UPF1 742 for uplink packets and UPF2 744 for downlink packets.
3. Install all rules to be matched on "first" UPF1 742.
4. Install corresponding rules and actions on both UPF2 744 and UPF3 746.

For example, UPF1 742 may match a packet towards cisco.com (Rule #3), but not take any action since the action itself is installed on UPF2 744 upon uplink. UPF1 742 may include the Rule ID of Rule #3 in the header towards UPF2 744. Enhancements may be made on the N4 interface to indicate which rule ID's should be included on the N9 interface to optimize the header. Further, enhancements on the N9 header to include the Rule ID may be made in some implementations.

Figure 8:
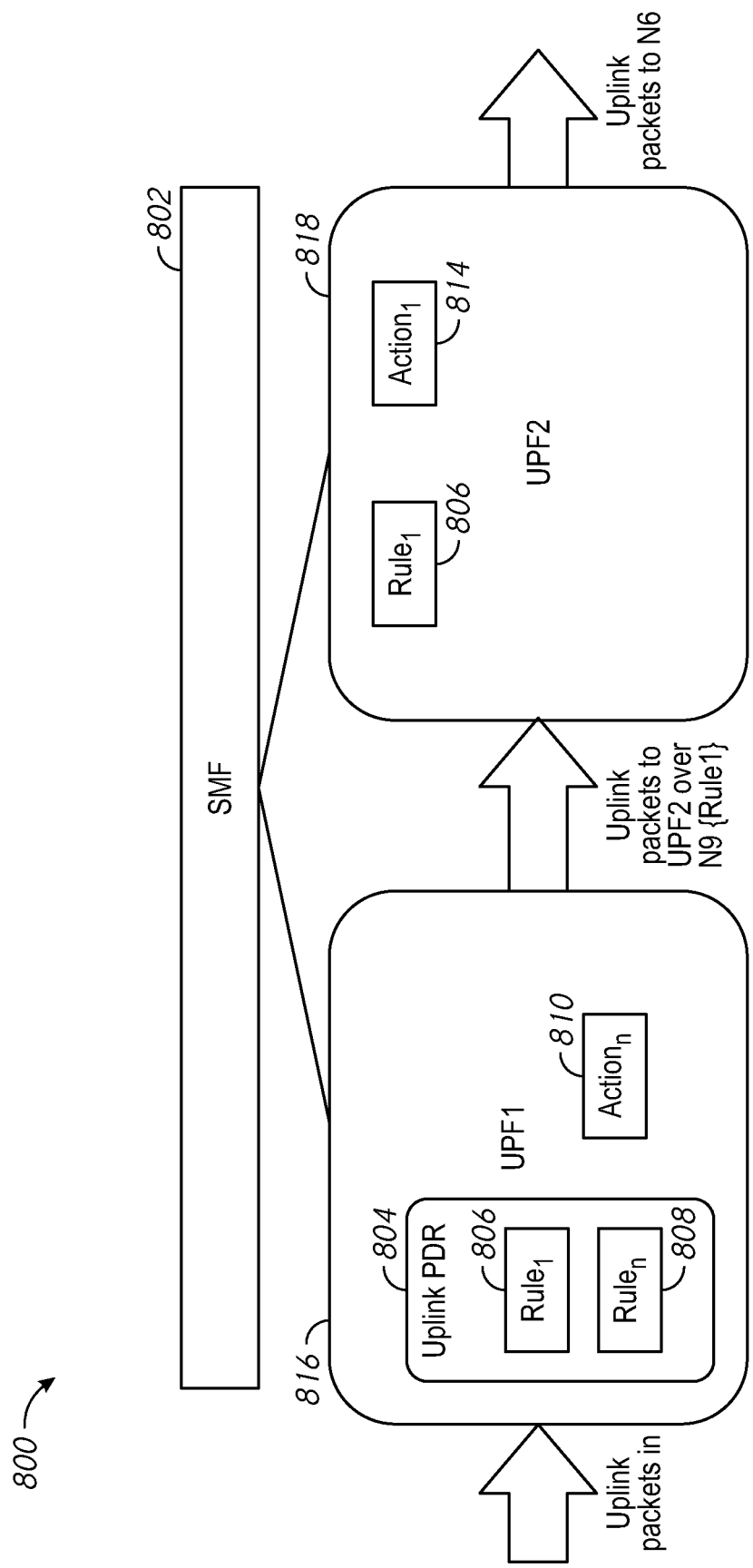
FIG. 8 is an exemplary system flow in accordance with some implementations.

FIG. 8 is an exemplary system flow 800 in accordance with some implementations. Exemplary system flow 800 may include SMF 802, UPF1 816 and UPF2 818. UPF1 816 may include uplink PDR 804 which traverses rule$_1$ 806 up to rule$_n$ 808. UPF1 816 may take action$_n$ 810 while passing only rule$_1$ 806 which is needed on UPF2 818 in order to take actions 814. In exemplary system flow 800, SMF 802 may perform determination of which rules to be installed where, and which rules ID should be included on the N9 header.

In an exemplary implementation, the SMF 802 may first install all rules to be matched on uplink packets on the UPF1 816. SMF 802 may then indicate to UPF1 816 that Rules 806, when matched should be included on the N9 GTP-U header. Subsequently, UPF2 818 may only install rules that UPF2 818 needs to take actions on.

Figure 9:
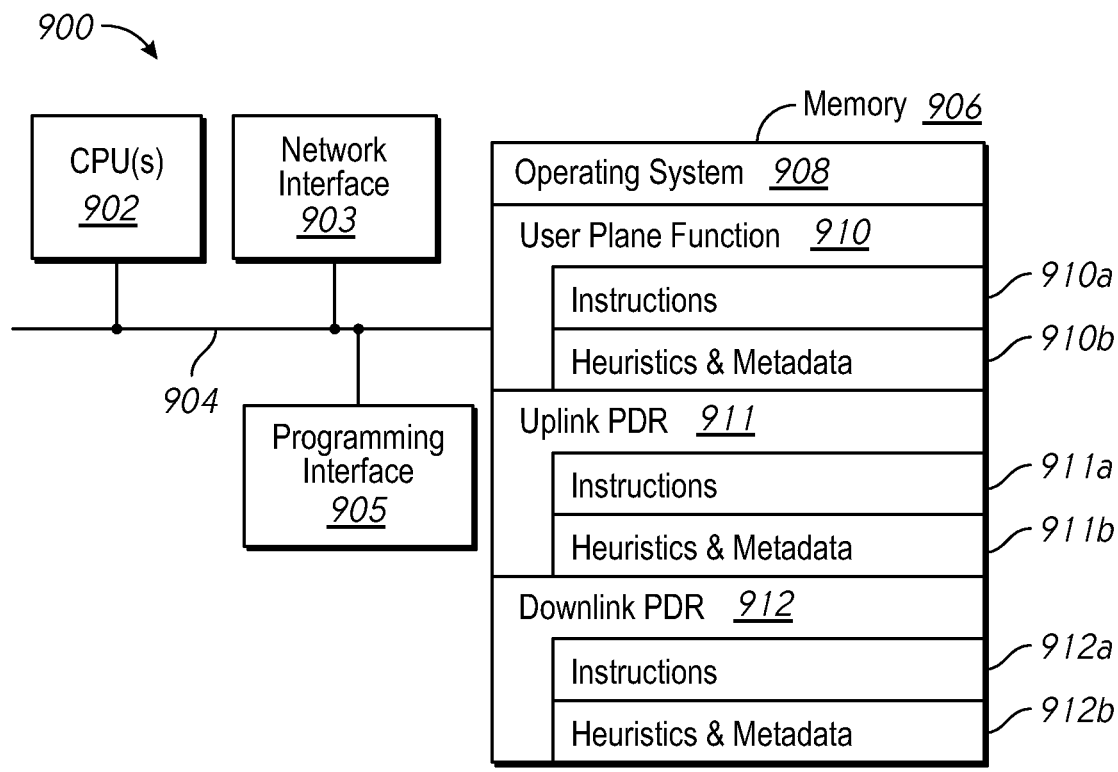
FIG. 9 is a block diagram of a server system enabled with various components of the UPF in accordance with some implementations.

FIG. 9 is a block diagram of UPF 900 enabled with various components of the A-UPF PSA 116 in accordance with some implementations. UPF 900 may be a packet gateway controller or device in some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the UPF 900 includes one or more processing units (CPUs) 902, a network interface 903, a programming interface 905, a memory 906, and one or more communication buses 904 for interconnecting these and various other components.

In some implementations, the network interface 903 is provided to, among other uses, establish and maintain an N4, N9, N4', N3, and/or segment routing communications channel. In some implementations, the communication buses 904 include circuitry that interconnects and controls communications between system components. The memory 906 includes high-speed random-access memory, such as DRAM, SRAM, DDR RAM or other random access solid state memory devices, and may include non-volatile memory, such as one or more magnetic disk storage devices, optical disk storage devices, flash memory devices, or other non-volatile solid-state storage devices. The memory 906 optionally includes one or more storage devices remotely located from the CPU(s) 902. The memory 906 comprises a non-transitory computer readable storage medium.

In some implementations, the memory 906 or the non-transitory computer readable storage medium of the memory 906 stores the following programs, modules and data structures, or a subset thereof including an optional operating system 908, a user plane function 910, an uplink PDR 911, and a downlink PDR 912. In some implementations, the user plane function 910 functions identically to the UPF's in FIGS. 1-8. For example, user plane function 910 may transmit session establishment requests and receive session establishment responses. Similarly, in some implementations, user plane function 910 may process data packets and user segment routing to communicate with other user plane functions. In other embodiments, the user plane function 910 may process and amend TLV's as needed for direct communication with another intermediate user plane function.

In some implementations, the uplink PDR 911 functions similar to the uplink PDR in FIGS. 5-8. For example, the uplink PDR 911 may traverse a set of rules and perform the appropriate actions to be taken on the UPF where the rules are traversed. Further, uplink PDR 911 may communicate the rule ID's which are to be taken on each of the subsequent PGC over an enhanced N9 interface.

In some implementations, the downlink PDR 912 functions similar to the downlink PDR in FIGS. 5-8. The downlink PDR 912 may be the first to receive packets in the downlink path. The downlink PDR 912 may indicate to later downlink PDR's to skip rule matching since the transmitted header includes only matched rules for the PGC. To that end, in various implementations, the user plane function 910 includes instructions and/or logic 910*a*, and heuristics and metadata 910*b*. In various implementations, the uplink PDR 911 includes instructions and/or logic 911*a*, and heuristics and metadata 911*b*. In various implementations, the downlink PDR 912 includes instructions and/or logic 912*a*, and heuristics and metadata 912*b*.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented, and/or a method may be practiced using any number of the aspects set forth herein. In addition, such an apparatus may be implemented, and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising: determining, by a first packet gateway controller connected to a first session manager device, that a user equipment moved to a geographical area that is served by a second session manager device; receiving, by the first packet gateway controller, a set of information for a second packet gateway controller; transmitting, by the first packet gateway controller, a session establishment request via a first network interface to the second packet gateway controller using segment routing via a second network interface; receiving, by the first packet gateway controller, a session establishment response of a first network interface type from the second packet gateway controller, via the second network interface, confirming the second packet gateway controller's ability to meet a requested quality of service and maximum bit rate, and providing the second packet gateway controller's address, and a set of tunnel identifiers; and transmitting, by the first packet gateway controller, the session establishment response of the first network interface type, to the first session manager device.

2. The method of claim 1, wherein the set of information for the second packet gateway controller includes an end function with a segment identifier address of the second packet gateway controller.

3. The method of claim 2, wherein the first session manager device determines the second packet gateway controller segment identifier address from a static configuration, or an address signaled by a network repository.

4. The method of claim 2, wherein, when a type length value from the end function contains a tunnel endpoint identifier: transmit a reply by the first packet gateway controller to the first session manager device.

5. The method of claim 4, wherein the type length value contains a message type, a quality of service requirement, a minimum bit rate requirement, a session identification value, uplink and downlink endpoint identifiers, and a failure code.

6. The method of claim 1, wherein the session establishment request includes a target next generation radio access network address, uplink and downlink tunnel identifiers.

7. The method of claim 1, wherein the first packet gateway controller matches a set of rules for packets received at the first packet gateway controller and adds a set of matched rule identifiers to a header.

8. The method of claim 7, wherein the header is transmitted over the second network interface to a subsequent packet gateway controller that skips rule matching and takes appropriate actions based on rules indicated from the matched rule identifiers.

9. A computing device comprising: a processor provided to execute computer readable instructions included on a non-transitory memory; and a non-transitory memory including computer readable instructions, that when executed by the processor, cause the computing device to: determine, by a first packet gateway controller connected to a first session manager device, that a user equipment moved to a geographical area that is served by a second session manager device; receive, by the first packet gateway controller, a set of information for a second packet gateway controller; transmit, by the first packet gateway controller, a session establishment request via a first network interface to the second packet gateway controller using segment routing via a second network interface; receive, by the first packet gateway controller, a session establishment response of a first network interface type from the second packet gateway controller, via the second network interface, confirming the second packet gateway controller's ability to meet a requested quality of service and maximum bit rate, and providing the second packet gateway controller's address, and a set of tunnel identifiers; and transmit, by the first packet gateway controller, the session establishment response of the first network interface type, to the first session manager device.

10. The computing device of claim 9, wherein the set of information for the second packet gateway controller includes an end function with a segment identifier address of the second packet gateway controller.

11. The computing device of claim 10, wherein the first session manager device determines the second packet gateway controller segment identifier address from a static configuration, or an address signaled by a network repository.

12. The computing device of claim 10, wherein, when a type length value from the end function contains a tunnel endpoint identifier: transmit a reply by the first packet gateway controller to the first session manager device.

13. The computing device of claim 12, wherein the type length value contains a message type, a quality of service requirement, a minimum bit rate requirement, a session identification value, uplink and downlink endpoint identifiers, and a failure code.

14. The computing device of claim 9, wherein the session establishment request includes a target next generation radio access network address, uplink and downlink tunnel identifiers.

15. The computing device of claim 9, wherein the first packet gateway controller matches a set of rules for packets received at the first packet gateway controller and adds a set of matched rule identifiers to a header.

16. The computing device of claim 15, wherein the header is transmitted over the second network interface to a subsequent packet gateway controller that skips rule matching and takes appropriate actions based on rules indicated from the matched rule identifiers.

17. A non-transitory computer readable storage medium storing one or more programs, the one or more programs comprising instructions, which, when executed by a computing device with a non-transitory memory and one or more processors, cause the computing device to perform or cause performance of: determining, by a first packet gateway controller connected to a first session manager device, that a user equipment moved to a geographical area that is served by a second session manager device; receiving, by the first packet gateway controller, a set of information for a second packet gateway controller; controller transmitting, by the first packet gateway controller, a session establishment request via a first network interface to the second packet gateway controller using segment routing via a second network interface; receiving, by the first packet gateway controller, a session establishment response of a first network interface type from the second packet gateway controller, via the second network interface, confirming the second packet gateway controller's ability to meet a requested quality of service and maximum bit rate, and providing the second packet gateway controller's address, and a set of tunnel identifiers; and transmitting, by the first packet gateway controller, the session establishment response of the first network interface type, to the first session manager device.

18. The non-transitory computer readable storage medium of claim 17, wherein the set of information for the second packet gateway controller includes an end function with a segment identifier address of the second packet controller.

19. The non-transitory computer readable storage medium of claim 18, wherein the first session manager device determines the second packet gateway controller segment identifier address from a static configuration, or an address signaled by a network repository.

20. The non-transitory computer readable storage medium of claim 18, wherein, when a type length value from a segment routing header contains a tunnel endpoint identifier: transmit a reply by the first packet gateway controller to the first session manager device.

* * * * *